United States Patent
Rolland-Neviere et al.

(10) Patent No.: US 9,922,392 B2
(45) Date of Patent: Mar. 20, 2018

(54) METHOD FOR WATERMARKING A THREE-DIMENSIONAL OBJECT

(71) Applicant: THOMSON LICENSING, Issy les Moulineaux (FR)

(72) Inventors: Xavier Rolland-Neviere, Marcq-en-Baroeul (KR); Gwenael Doerr, Rennes (FR); Pierre Alliez, Le Chesnay (FR)

(73) Assignee: Thomson Licensing, Issy-les-Moulineaux (FR)

( * ) Notice: Subject to any disclaimer, the term of this patent is extended or adjusted under 35 U.S.C. 154(b) by 70 days.

(21) Appl. No.: 14/924,653

(22) Filed: Oct. 27, 2015

(65) Prior Publication Data

US 2016/0117792 A1 Apr. 28, 2016

(30) Foreign Application Priority Data

Oct. 27, 2014 (EP) .................................... 14306709

(51) Int. Cl.
*G06T 1/00* (2006.01)
*G06T 17/20* (2006.01)

(52) U.S. Cl.
CPC .......... *G06T 1/0092* (2013.01); *G06T 1/0064* (2013.01); *G06T 17/205* (2013.01);
(Continued)

(58) Field of Classification Search
CPC .......... G06T 2201/0083; G06T 17/205; G06T 1/0064; G06T 1/0092; G06T 2201/0051; G06T 2201/0065

See application file for complete search history.

(56) References Cited

U.S. PATENT DOCUMENTS

| 2003/0128209 A1* | 7/2003 | Maekawa | ............ | G06T 1/0064 345/420 |
| 2003/0208679 A1* | 11/2003 | Lopez Vazquez | .... | G06T 1/0064 713/176 |

(Continued)

FOREIGN PATENT DOCUMENTS

| CN | 102622721 | 1/2014 |
| DE | 19860225 | 6/2000 |

OTHER PUBLICATIONS

Mauro Barni, Franco Bartolini, Vito Cappellini, Massimiliano Corsini, Andrea Garzelli; "Digital watermarking of 3D meshes"; SPIEdigital library; 2004.*

(Continued)

*Primary Examiner* — Stephen R Koziol
*Assistant Examiner* — Shaghayegh Azima
(74) *Attorney, Agent, or Firm* — Myers Wolin LLC

(57) ABSTRACT

A method for watermarking a three-dimensional object is disclosed. The three-dimensional object is represented by a mesh. A mesh comprises a plurality of vertices. The method further comprises computing an original thickness signature for said mesh from a plurality of thickness values, wherein a thickness value is computed for a vertex of the mesh; determining a target thickness signature, wherein the target thickness signature is a function of a watermark payload and of the original thickness signature; and modifying a position of at least one vertex of the mesh wherein a thickness signature computed for the modified mesh reaches the target thickness signature and wherein a distortion constraint between the mesh and the modified mesh is satisfied.

A method for detecting a watermark in a three-dimensional object, a three-dimensional object carrying a watermark and, devices for implementing the methods are further disclosed.

11 Claims, 3 Drawing Sheets

(52) U.S. Cl.
CPC ............ *G06T 2201/0051* (2013.01); *G06T 2201/0065* (2013.01); *G06T 2201/0083* (2013.01)

(56) References Cited

U.S. PATENT DOCUMENTS

| | | | |
|---|---|---|---|
| 2011/0044494 A1 | 2/2011 | Bradley et al. | |
| 2011/0286624 A1* | 11/2011 | Choi | G06T 1/0028 382/100 |
| 2015/0170313 A1* | 6/2015 | Rolland-Neviere | G06K 9/4642 382/100 |

OTHER PUBLICATIONS

Jae-Won Cho, Remy Prost, and Ho-Youl Jung; "An Oblivious Watermarking for 3-D Polygonal Meshes Using Distribution of Vertex Norms", IEEE Jan. 2007.*

Luo et al "Surface-Preserving Robust Watermarking of 3-D Shapes" IEEE trabsactions on image precessing, vol. 20, N°10, pp. 2813-2826.

Cho et al "An Oblivious Watermarking for 3-D Polygonal Meshes Using Distribution of Vertex Norms" IEEE transactions on signal processing, vol. 55, n° 1, pp. 142-155.

Agarwal et al "Robust blind watermarking mechanism for motion data stream" Proceedings of the 8th workshop on Multimedia and security, pp. 230-235; 2006.

Hu et al "Constrained optimization of 3D polygonal mesh watermarking by quadric programming", Proceedings of the 2009 IEEE International conference on acoustics, Speech and signal proceeding, pp. 1501-1504.

Shapira et al "Consistent mesh partitioning and skeletonisation using the shape diameter function", Visual computer, pp. 249-259.

Rolland-Neviere et al: "Triangle surface mesh watermarking based on a constrained optimization framework", IEEE Transactions on Information Forensics and Security,Sep. 1, 2014, vol. 9, n°9, p. 1491-1501.

Lee et al :"Multiple 3D medical data watermarking for healthcare data management", Journal of Medical Systems, Kluwer Academic publishers-Plenum publishers, vol. 35, n°6, Mar. 3, 2010, pp. 1573-1593.

Zhan et al: "A blind watermarking algorithm for 3D mesh models based on vertex curvature", Journal of Zhejiang University Science C, vol. 15, n°5, May 1, 2014, pp. 351-362.

Rolland-Neviere et al: "Robust Diameter-Based Thickness Estimation of 3D Objects", Graphical Models, vol. 75, pp. 279-296, 2013.

Xia et al: "Distance Solutions for Medial Axis Transform", Proceedings of the 18th International Meshing Roundtable, pp. 247-265, 2009.

Chillet et al: "Thickness Estimation of Discrete Tree-Like Tubular Objects: Application to Vessel Quantification", Lecture Notes in Computer Science, vol. 3540, pp. 263-271, 2005.

Baran et al: "Automatic Rigging and Animation of 3D Characters", ACM Transactions on Graphics, vol. 26, issue 3, article 72, 2007; pp. 72-2 to 72-8.

Search Report dated Jun. 19, 2015.

* cited by examiner

METHOD FOR WATERMARKING A THREE-DIMENSIONAL OBJECT

This application claims the benefit, under 35 U.S.C. § 119 of European Patent Application No. 14306709.8, filed Oct. 27, 2014.

TECHNICAL FIELD

The present principles relate to three-dimensional (3D) object watermarking. More particularly, a method for watermarking a three-dimensional object and a method for detecting such watermark is disclosed. Associated devices implementing the methods and a watermarked 3D object are also disclosed.

BACKGROUND ART

This section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Digital watermarking consists in modifying a multimedia content in a robust and imperceptible way, in order to hide a secret message. Applications of watermarking range from broadcast monitoring to copyright protection through metadata binding. In particular, robust watermarking methods are essential components of content protection architectures. The embedded message (referred to as the watermark payload) indeed constitutes a forensic piece of evidence for traitor tracing tasks, e.g. by identifying a leak when a content is illegally made available on the Internet.

The popularity of 3D generated models has created the need for dedicated methods designed to tackle robust watermarking of meshes. Meshes are assumed to be piecewise-linear approximations of the surface boundary of 3D objects. They are formally defined by a set V of $n_v$ vertices, a set E of $n_e$ edges and a set F of $n_f$ facets. 3D watermarking methods focus on the common triangle mesh representation. 3D watermarking for animated meshes is a technical domain with focus on watermarking of meshes which have already been animated. In this context, the mesh is not only characterized by its set of vertices V, edges E and faces E, but also by the position of the vertices throughout the animation (the time component).

For animated meshes, Agarwal et al. disclose in "*Robust blind watermarking mechanism for motion data streams*" (Proceedings of the 8th workshop on Multimedia and security, pp. 230-235, 2006) a watermarking algorithm based on the dynamics of the mesh skeleton. The skeleton corresponds to a set of joints and bones virtually attached to the vertices of the input model. By modifying the relative positioning of the different bones composing the skeleton, the vertices are moved accordingly in some kind of elastic fashion, thereby granting the animation creator with the ability to pose the 3D model in any desired way. A pose is an isometric transformation of the 3D mesh, i.e. all geodesic distances between pairs of surface points are preserved. For a humanoid 3D object, a pose corresponds for instance to raising an arm, extending a leg, etc. As a result, by defining a temporal sequence of poses, it is possible to design an animation e.g. the walking cycle of a character. This animation can be done manually by an artist or by using motion capture (MOCAP) devices to record the movements of a performing actor. The method disclosed by Agarwal et al. embeds the watermark by altering the temporal trajectory of some elements of the 3D model, such as joints or vertices. In their preferred embodiment, such an embedding is based on a wavelet decomposition of the space-curve associated with the temporal trajectory. In other words, the animation of the mesh is modified but not the mesh itself. As such, a limitation of this technique is that (i) changing the animation of the 3D object discards the watermark and (ii) the watermark cannot be recovered from a single pose of the animation. A method for 3D meshes that embeds a watermark in the geometry of the mesh in a way that is pose-invariant, and thus oblivious to animation parameters, is therefore desirable.

In prior work, the challenge of pose invariance in 3D mesh watermarking has been tackled using geodesic distances. The geodesic distance refers to the shortest path on the surface of the object between two points of a 3D object. As mentioned earlier, such distances are expected to be barely affected by poses taken by the object during the temporal animation. In "*Surface-Preserving Robust Watermarking of 3D Shapes*" (IEEE Transactions on Image, Processing, vol. 20, pp. 2813-2826, 2011), A. G. Bors and M. Luo disclose a watermarking method relying on watermarking the histogram of the geodesic distances between the vertices and a pseudo-random reference point on the surface of the object. While this watermarking technique is oblivious to animation, it also has two major limitations, one being inherent to the use of geodesic distances. First, geodesic distances are highly sensitive to noise addition and thus provide limited watermark robustness against this type of attack. Second, the use of a pseudo-random reference point makes the watermarking system very weak against desynchronization attacks such as cropping. A method for 3D meshes that embeds a watermark in the geometry of the mesh in a way that is pose-invariant and robust to a large range of attacks is therefore needed.

SUMMARY

The purpose of the present principles is to overcome at least one of the disadvantages of the prior art by proposing a 3D watermarking method for 3D meshes based on a novel pose-invariant quantity. The present principles relate to the usage of the thickness of a 3D object as a watermarking pose-invariant quantity. The input of the method is a surface mesh (a set of vertices with their positions, a set of edges connecting pairs of vertices, and a set of faces) representing the surface boundary of the object. The method comprises a local thickness estimation. The watermark is then embedded by altering the statistical properties of the distribution of the estimated local thickness. Since the thickness of a 3D object is a very robust quantity, especially with regard to deformations such as different poses of an object, this watermarking method advantageously provides superior robustness performances against posing, noise addition, remeshing, re-sampling, and so on compared to techniques previously disclosed in the literature. The method is advantageously compatible with various definitions of the local thickness comprising the distance from the skeleton (either designed by an animator or estimated from an algorithm) to a vertex, or the distance from a cloud of points to a vertex. In a nutshell, the local thickness is a distance of a vertex with respect to a collection of points (skeleton, cloud, even medial axis as disclosed latter) representative of the structure of the objet. Such points are located inside in 3D object.

To this end, a method for watermarking a three-dimensional object is disclosed, wherein the three-dimensional object is represented by a mesh, the mesh comprising a plurality of vertices. The watermarking method comprises:

Computing an original thickness signature for said mesh from a plurality of thickness values, wherein a thickness value is computed for a vertex of the mesh;

Determining a target thickness signature; the target thickness signature being a function of a watermark payload and of the original thickness signature; and Modifying a position of at least one vertex of the mesh wherein a thickness signature computed for the modified mesh reaches the target thickness signature and wherein a distortion constraint between the mesh and the modified mesh is satisfied.

Such method improves the robustness of the watermarking especially in the case of 3D object posing, noise addition, remeshing, re-sampling.

In a variant, the thickness value for a vertex comprises a distance between the vertex and a skeleton of the mesh. In another variant, the thickness value for a vertex comprises a distance between the vertex and a cloud of half diameter points. Other variants for the thickness value are also compatible with the watermarking method.

According to a particular embodiment, modifying a position of at least one vertex of the mesh comprises using a solver in order to obtain the target thickness signature while minimizing a distortion metric between the mesh and said modified mesh.

According to a characteristic of the present principles, a distortion metric comprises a mean square error of positions of the plurality of vertices.

In preferred embodiments, the thickness signature comprises an average thickness value in each bin of a histogram constructed with the plurality of thickness values or an area corresponding to a surface patch associated to the vertices within a bin of this histogram. However, the present principles are not limited to those 2 embodiments and the skilled in the art could contemplate embodiments of signature representative of statistical properties of the distribution of thickness values.

In a second aspect, a method for detecting a watermark in a three-dimensional object is disclosed, wherein the three-dimensional object is represented by a mesh comprising a plurality of vertices. The method comprises:

Computing a thickness signature for said mesh from a plurality of thickness values, wherein a thickness value is computed for a vertex of the mesh;

Determining a watermark payload from the thickness signature.

Any characteristic or variant described for the watermarking method is compatible with the detecting method, for instance the thickness values, or thickness signature.

In a third aspect, the present principles are also directed to a three-dimensional object resulting from the disclosed watermarking method.

In a fourth aspect, the present principles are directed to a device for watermarking a three-dimensional object comprising at least one processor configured to implement the disclosed method. Besides, the present principles are directed to a device for watermarking a three-dimensional object comprising means for implementing the disclosed method.

In a fifth aspect, the present principles are directed to a device for detecting a watermark in a three-dimensional object comprising at least one processor configured to implement the disclosed detecting method. Besides, the present principles is directed to a device for detecting a watermark in a three-dimensional object from a three-dimensional object comprising means for implementing the disclosed detecting method.

In a sixth aspect, the present principles are directed to a computer program product comprising program code instructions to execute the steps of the disclosed methods, according to any of the embodiments and variants disclosed, when this program is executed on a computer.

In a seventh aspect, the present principles are directed to a processor readable medium having stored therein instructions for causing a processor to perform at least the steps of the disclosed methods, according to any of the embodiments and variants disclosed.

While not explicitly described, the present embodiments may be employed in any combination or sub-combination. For example, the present principles are not limited to the described thickness values, nor to the described signature and any robust thickness value can be used.

Besides, any characteristic or variant described for the watermarking method is compatible with a device intended to process the disclosed method and with a computer-readable storage medium storing program instructions.

BRIEF DESCRIPTION OF THE DRAWINGS

Other characteristics and advantages of the present principles will appear through the description of a non-limiting embodiment of the present principles, which will be illustrated, with the help of the enclosed drawings.

DETAILED DESCRIPTION OF PREFERRED EMBODIMENTS

Figure 1:
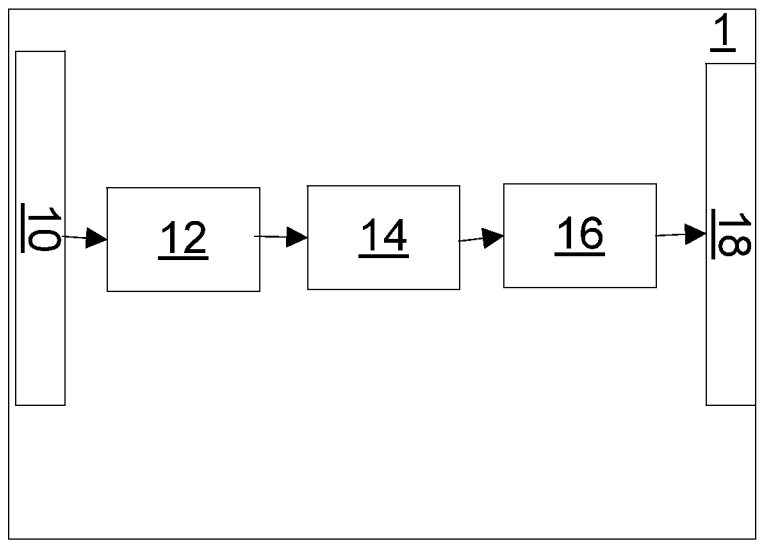
FIG. 1 illustrates a processing device implementing the watermarking method according to a particular embodiment.

FIG. 1 depicts a processing device 1 for watermarking a three-dimensional object according to a specific and non-limitative embodiment of the present principles. The processing device 1 comprises an input 10 configured to receive a 3D object. Meshes are assumed to be piecewise-linear approximations of the surface boundary of 3D objects. They are formally defined by a set of vertices 7, a set of edges E and a set of facets F. 3D watermarking methods focus on the common triangle mesh representation. As such, the three-dimensional object or its representation comprises a plurality of vertices. The terms "3D object", "3D object model", "3D object representation" or "3D object mesh" are interchangeable in the specification. According to different embodiments of the present principles, the source belongs to a set comprising:

a local memory, e.g. a video memory, a RAM, a flash memory, a hard disk;

a storage interface, e.g. an interface with a mass storage, a ROM, an optical disc, or a magnetic support;

a communication interface, e.g. a wired interface (for example a bus interface, a wide area network interface, a local area network interface) or a wireless interface (such as a IEEE 802.11 interface or a Bluetooth interface); and a shape capturing circuit e.g. 3D scanner.

The input 10 is linked to a module 12 configured to compute an original thickness signature wherein a thickness value is computed for each vertex among the plurality of vertices. In a variant, the thickness value is computed not for each vertex of the mesh, but only for a sub-set of vertices of the mesh. The computation of a thickness value and of the thickness signature is described hereafter with the methods with more details. The module 14 is then configured for determining a target thickness signature using the original thickness signature and a watermark payload, for example by means of a secret key. The module 16 is then configured to modify the position of at least one vertex so that the thickness signature of the modified object is close to the target thickness signature and so that the introduced distortion satisfies a distortion constraint. The module 16 is linked to an output 18. The watermarked 3D object can be stored in a memory. As an example, the 3D object is stored in a remote or in a local memory, e.g. a video memory or a RAM, a hard disk. In a variant, the 3D object is sent to a receiver by means of a storage interface, e.g. an interface with a mass storage, a ROM, a flash memory, an optical disc or a magnetic storage and/or transmitted over a communication interface, e.g. an interface to a point-to-point link, a communication bus, a point to multipoint link or a broadcast network. In another variant, the 3D object is printed.

Figure 2:
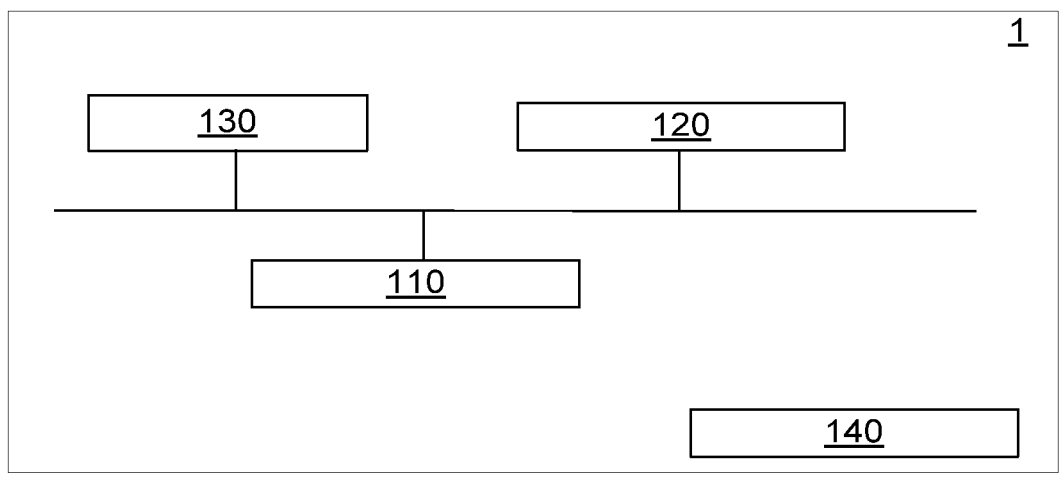
FIG. 2 illustrates an exemplary architecture of the processing device of FIG. 1, according to a specific and non-limitative embodiment.

FIG. 2 represents an exemplary architecture of the processing device 1 according to a specific and non-limitative embodiment of the present principles. The processing device 1 comprises one or more processor(s) 110, which is(are), for example, a CPU, a GPU and/or a DSP (English acronym of Digital Signal Processor), along with internal memory 120 (e.g. RAM, ROM, EPROM). The processing device 1 comprises one or several Input/Output interface(s) 130 adapted to display output information and/or allow a user entering commands and/or data (e.g. a keyboard, a mouse, a touchpad, a webcam, a display); and a power source 140 which may be external to the processing device 1. The processing device 1 may also comprise network interface(s) (not shown). According to an exemplary and non-limitative embodiment of the present principles, the processing device 1 further comprises a computer program stored in the memory 120. The computer program comprises instructions which, when executed by the processing device 1, in particular by the processor 110, make the processing device 1 carry out the processing method described in FIG. 5. According to a variant, the computer program is stored externally to the processing device 1 on a non-transitory digital data support, e.g. on an external storage medium such as a HDD, CD-ROM, DVD, a read-only and/or DVD drive and/or a DVD Read/Write drive, all known in the art. The processing device 1 thus comprises an interface to read the computer program. Further, the processing device 1 could access one or more Universal Serial Bus (USB)-type storage devices (e.g., "memory sticks.") through corresponding USB ports (not shown).

According to exemplary and non-limitative embodiments, the processing device 1 is a device, which belongs to a set comprising:

a mobile device;

a communication device;

a game device;

a tablet (or tablet computer);

a laptop (or desktop);

a 3D scanner;

a motion capture device;

an encoding chip;

a decoding chip;

a 3D mesh server;

a 3D mesh sharing platform.

Figure 3:
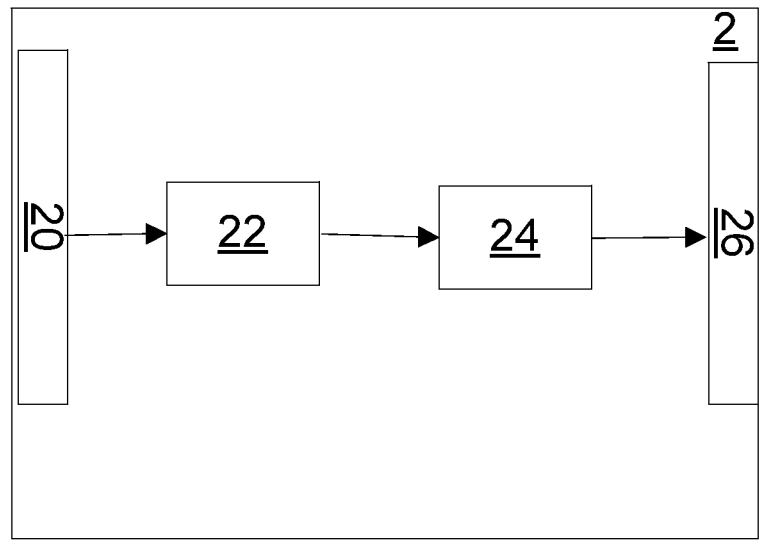
FIG. 3 illustrates a processing device implementing the obtaining method according to a particular embodiment.

FIG. 3 depicts a processing device 2 for detecting a watermark, i.e. obtaining or retrieving a watermark payload, from a three-dimensional object according to a specific and non-limitative embodiment of the present principles. The processing device 2 comprises an input 20 configured to receive a 3D object from a source. In the common mesh representation, the three-dimensional object comprises a plurality of vertices. According to different embodiments of the present principles, the source belongs to a set comprising:

a local memory, e.g. a video memory, a RAM, a flash memory, a hard disk;

a storage interface, e.g. an interface with a mass storage, a ROM, an optical disc or a magnetic support;

a communication interface, e.g. a wired interface (for example a bus interface, a wide area network interface, a local area network interface) or a wireless interface (such as a IEEE 802.11 interface or a Bluetooth interface); and a shape capturing circuit e.g. 3D scanner.

The input 20 is linked to a module 22 configured to compute the thickness signature, wherein a thickness value is computed for each vertex of the mesh or for a subset of vertices of the mesh as later on described. The module 24 is then configured to obtain the watermark payload from the thickness signature, for example by means of a secret key. The module 24 is linked to an output 26. The 3D object and the extracted payload can be stored in a memory. As an example, the 3D object is stored in a remote or in a local memory, e.g. a video memory or a RAM, a hard disk. In a variant, the 3D object and associated payload are sent to a rendering device by means of a storage interface, e.g. an interface with a mass storage, a ROM, a flash memory, an optical disc or a magnetic storage and/or transmitted over a communication interface, e.g. an interface to a point-to-point link, a communication bus, a point to multipoint link or a broadcast network.

Figure 4:
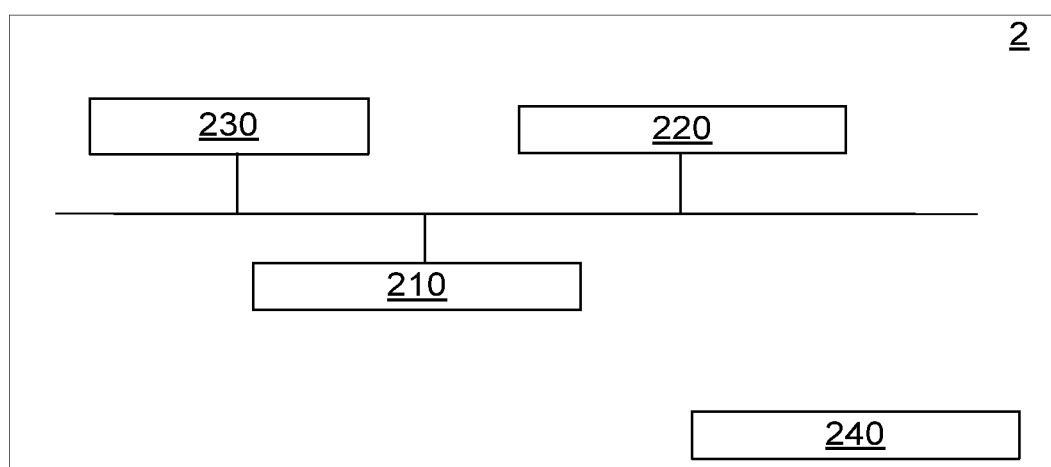
FIG. 4 illustrates an exemplary architecture of the processing device of FIG. 3, according to a specific and non-limitative embodiment.

FIG. 4 represents an exemplary architecture of the device 2 according to a specific and non-limitative embodiment of the present principles. The processing device 2 comprises one or more processor(s) 210, which is(are), for example, a CPU, a GPU and/or a DSP (English acronym of Digital Signal Processor), along with internal memory 220 (e.g. RAM, ROM, EPROM). The processing device 2 comprises one or several Input/Output interface(s) 230 adapted to display output information and/or allow a user entering commands and/or data (e.g. a keyboard, a mouse, a touchpad, a webcam, a display); and a power source 240 which may be external to the processing device 2. The processing device 2 may also comprise network interface(s) (not shown). According to an exemplary and non-limitative embodiment of the present principles, the processing device 2 further comprises a computer program stored in the memory 220. The computer program comprises instructions which, when executed by the processing device 2, in particular by the processor 220, make the processing device 2 carry out the processing method described in FIG. 6. According to a variant, the computer program is stored externally to the processing device 2 on a non-transitory digital data support, e.g. on an external storage medium such as a HDD, CD-ROM, DVD, a read-only and/or DVD drive and/or a DVD Read/Write drive, all known in the art. The processing device 2 thus comprises an interface to read the computer program. Furthermore, the processing device 2 could access one or more Universal Serial Bus (USB)-type storage devices (e.g., "memory sticks.") through corresponding USB ports (not shown).

According to exemplary and non-limitative embodiments, the processing device 2 is a device, which belongs to a set comprising:
- a mobile device;
- a communication device;
- a game device;
- a tablet (or tablet computer);
- a laptop (or desktop);
- a 3D printer;
- an encoding chip;
- a decoding chip;
- a 3D mesh server;
- a 3D mesh sharing platform.

Figure 5:
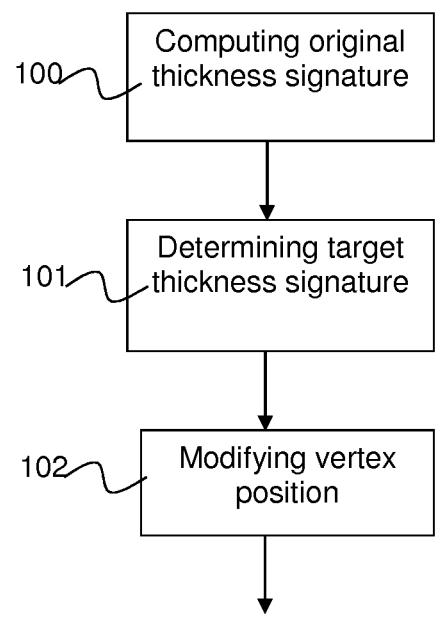
FIG. 5 illustrates the method for watermarking a 3D object according to a preferred embodiment.

FIG. 5 illustrates the method for watermarking a 3D object according to a preferred embodiment. In this embodiment, the method comprises in a first step 100 computing an original thickness signature. More specifically, a robust local thickness value is estimated at multiple locations on the surface, which can be vertices, centers of facets, or random sample points. According to different variants, the local thickness can be:
  i. directly approximated from the mesh diameter;
  ii. approximated from a more robust quantity based on the mesh diameter and involving multiple post-processing operations as disclosed in "*Robust Diameter-Based Thickness Estimation of 3D Objects*" by the inventors (Graphical Models, vol. 75, pp. 279-296, 2013) or in "*Consistent Mesh Partitioning and Skeletonisation using the Shape Diameter Function*" by L. Shapira et al (in Visual Computer, pp 249-259, 2008).
  iii. estimated using a robust medial axis construction as disclosed in "*Distance Solutions for Medial Axis Transform*" by H. Xia and P. Tucker (Proceedings of the 18th International Meshing Roundtable, pp. 247-265, 2009);
  iv. estimated from any alternate procedure designed to approximate the local thickness of the input 3D object as disclosed in "*Thickness Estimation of Discrete Tree-Like Tubular Objects: Application to Vessel Quantification*" by D. Chillet et al. (Lecture Notes in Computer Science, vol. 3540, pp. 263-271, 2005);
  v. estimated with regard to the animation skeleton, in case it is available before watermarking.

According to the variant (ii), a local thickness estimation is computed using the method disclosed in "*Robust Diameter-Based Thickness Estimation of 3D Objects*" by the authors of this present principles (Graphical Models, vol. 75, pp. 279-296, 2013). The surface of the input mesh is first densely sampled. For each sampled point, a robust local mesh diameter estimation is computed based on the intersection of the surface of the object with virtual rays randomly launched inward from the sampled point. A half-diameter cloud of points is then constructed inside the mesh, using the sample points projected inward at half their estimated diameters along their normal directions. The thickness value estimated at every vertex of the 3D mesh is finally defined as a robust distance between its position and its nearest neighbours in the half-diameter cloud of points.

According to another variant (v), the thickness value for a vertex comprises a distance between the vertex and the bones of the animation skeleton. This animation skeleton can be either be part of a rigged mesh input to the system, or estimated using an automatic skeletonization method, such as the one disclosed "*Automatic Rigging and Animation of 3D Characters*" by I. Baran and J. Popovic (ACM Transactions on Graphics, volume 26, issue 3, article 72, 2007).

Next, in the first step 100, an original (or initial) thickness signature is computed using the local thickness values estimated for a set of vertices. In a first variant, computing the thickness signature comprises (i) constructing the histogram $t=\{t_i | i \in [[1, n_v]]\}$ of local thickness values $t_i$, comprising at least one bin, and (ii) determining the average thickness value $\mu_b$ in each bin of the histogram, possibly after normalizing all thickness values of each bin in [0,1] using an affine transform. In this case, the thickness signature can be viewed as a compact representation of the distribution of the thickness values. In a second variant, computing the thickness signature comprises (i) constructing the histogram $t=\{t_i | i \in [[1, n_v]]\}$ of local thickness values $t_i$, comprising a least one bin, and (ii) determining the area $a_b$ corresponding to the surface patch associated to the vertices within a bin of the histogram. In this case, the thickness signature captures a geometrical property of partition of the 3D objects, whose elements are defined by the thickness values. The man of the art will appreciate that the values of the thickness signature could be obfuscated to the adversary using a secret key, e.g. by discarding a pseudo-random portion of the thickness values at both ends of the distribution when constructing the histogram.

The watermarking process itself relies on altering the vertices of the mesh so that the corresponding thickness signature encodes the desired watermark payload. It comprises two parts: computing a target thickness signature that encodes the payload, i.e. the watermarked signature, and modifying the vertices of the mesh in order for the corresponding thickness signature to be close to the target watermarked one.

Thus in a second step 101, a target thickness signature is determined from the original thickness signature and the watermark payload to be inserted using a secret key. Any conventional method for watermarking 1D signals can be directly applied, e.g. spread-spectrum schemes or binning schemes.

According to a variant wherein a single bit of information is embedded, the thickness signature is reduced to a scalar value corresponding to a histogram with a single bin. To watermark such a scalar thickness signature, one could modulate the average thickness $\mu_1$ around the value 0.5 in a manner similar to spread-spectrum. More precisely, this can be mathematically written: $\mu_1^w = \mu_1 + \epsilon_1 \alpha$ where the superscript '$w$' indicated a watermarked quantity, $\alpha \in [0, 1/2$ [is the watermark embedding strength and $\epsilon_1 \in \{-1, 1\}$ is the payload bit to embed. Alternately, one could modulate the area $a_1$ so that its quantized value using a step size $\Delta$ is odd or even. More precisely, this can be mathematically written:

$$a_1^w = \lfloor \frac{a_1}{\Delta} \rfloor + \epsilon_1 \frac{\Delta}{2},$$

where the floor operator $\lfloor . \rfloor$ rounds the input scalar value to the nearest lower integer value. Advantageously, the man of the art will appreciate that a secret key could be used to pseudo-randomly offset the quantization grid and thereby provide superior security against an adversary.

In another variant wherein multiple bits of watermark payload are embedded, one simply needs to apply the steps of the first one-bit variant to all the elements of the thickness signature in case there is a one-to-one mapping between the payload bits, the bins of the histogram and the elements of the signature. Advantageously, each bit of payload could be associated to an integer number (larger than 1) of elements of the thickness signature. The man of the art will appreciate that such a strategy is expected to improve the fidelity-robustness trade-off in watermarking. Moreover, it also provides means to introduce pseudo randomness in the method, for instance thanks to shuffling and/or pseudo-random projections, and thereby increases the security against an adversary In a third step 102, the position of at least one vertex of the mesh is modified thus resulting in a modified mesh characterized in that the associated thickness signature is equal or close to the one computed in the step 101. Moreover, in order to preserve the fidelity of the original 3D object, the distortion induced by these modifications should remain minimal, i.e satisfies a distortion constraint. During this modification step, the man of the art will appreciate that a portion of the vertices included in the computation of the thickness signature could be left untouched, e.g. to avoid damaging highly sensitive parts of the object where modifications would be more noticeable.

To reach the target thickness signature, the vertices are moved alongside a relocation direction. In a first variant, these relocation directions are dependent on the variant of the thickness estimation and the underlying 'natural direction' along which is defined the thickness quantity:

the normal direction in the case of diameter-based thickness estimation;
the direction of the line supporting the smallest Euclidean distance between the considered vertex and a point on the skeleton in the case of skeleton-based thickness estimation.

In a variant, relocation directions can be set in arbitrarily directions. For instance, one could reuse a vector field created by an artist. Alternately, one could slightly adjust the relocation direction in an attempt to minimize the impact on the local roughness of the object. Once these directions are defined, vertices are moved along them and a salient feature of the present principles is to propose a mechanism that translates the changes to the thickness signature into individual relocation steps to be used for the selected subset of vertices to be modified.

When the thickness signature can be regarded as a compact representation of the distribution of thickness values, e.g. the average of thickness values in the bins of a histogram, a straightforward variant is simply to place the vertices at the distance given by the watermarked thickness signature. For instance, if $\mu_b^w = d$ after inversing the linear mapping in [0,1], the embedding reduces to displacing all vertices falling in the $b^{th}$ bin of the histogram so that they are placed at a distance d of the skeleton or the cloud of medial points. This strategy completely disregards the fidelity constraint and is therefore very crude. It could even produce degenerated cases: when there is a single bin in the histogram, the watermarked mesh reduces to a cylinder of diameter d surrounding the skeleton.

A slightly more evolved variant consists in applying a function, e.g. a power function $y=x^\gamma$, to the individual normalized thickness values $t_i$ associated the $b^{th}$ bin of the histogram to increase (with $\gamma>1$) or decrease (with $\gamma<1$) the average value $\mu_b$ and thereby reach the target value $\mu_b^w$. The individual thickness values obtained after applying the function can then be used as in the first variant to obtain the watermarked 3D object. The man of the art will appreciate that optimal transport techniques could be advantageously exploited to avoid relying on a predefined family of functions that may prove sub-optimal depending on the content. While this second variant is expected to better diffuse the distortion throughout the object and thus provide better fidelity, it may still not properly account for the induced distortion in the relocation process.

In a preferred variant, determining the relocation step for at least one vertex of the mesh is formulated as an optimization problem under constraints and comprises using a solver in order to obtain the target thickness signature while minimizing the distortion. The variables of the optimization problem are the amplitude of the displacements along the relocation directions. The quantity to minimize is a distortion metric between the mesh and the modified mesh. A simple solution is to use the mean square error of the displacement amplitudes. In order to better accommodate for the human perceptual system, one could advantageously incorporate perceptual components in the distortion metric. For instance, one could incorporate weights in the distortion metric to favor distortion in rough areas of the mesh and penalize displacements in smooth areas. The man of the art will appreciate that it may be necessary to approximate state-of-the-art perceptual metrics for 3D meshes to guarantee that the optimization problem could still be efficiently solved by a solver. The constraints to enforce are (i) that the thickness signature reaches the target watermarked one and (ii) that the displacements applied to the vertices do not make them fall in a different bin of the histogram. The latter constraints is typically achieved by setting bounds on the variables values, i.e. the amplitude of the displacements. Once the solver output a solution, it can be readily used as in the first and second variants to obtain the watermarked mesh.

In contrast with related works on radial distances as disclosed in "*Triangle Surface Mesh Watermarking based on a Constrained Optimization Framework*" by the same inventors (IEEE Transactions on Information Forensics and Security, volume 9, 1491-1501, 2014), it is difficult to fully express mathematically the causality constraints when using thickness values. In other words, re-computing the thickness values for the watermarked mesh may not yield the same values as the one during the embedding step 102. Such discrepancy is prone to introducing watermark decoding errors. To mitigate this problem, the embedding step 102 is performed iteratively. At each iteration, the detector is launched to check whether the extracted watermark is error-free or not. If it is error-free, the iterative process stops; otherwise, the new positions of the vertices are used as inputs for the next iteration of the embedding process. In practice, convergence is achieved in a few iterations at most.

The watermarking method thus results in a 3D watermarked object wherein a thickness signature computed for the watermarked mesh is close to a target thickness signature and wherein the target signature is function of a watermark payload and an original thickness signature corresponding to an original three-dimensional object. Advantageously, the watermarked 3D object is compatible with any definition of the thickness value.

Figure 6:
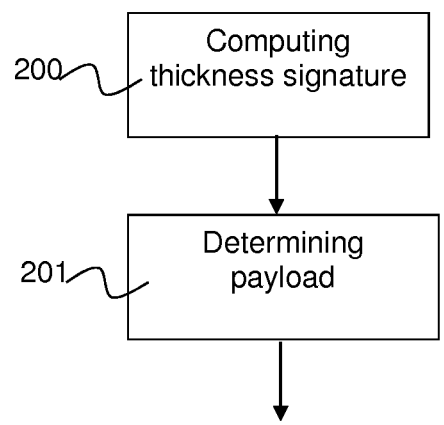
FIG. 6 illustrates the method for decoding a watermark in a 3D object according to a preferred embodiment.

FIG. 6 illustrates the method for decoding a watermark a 3D object according to a preferred embodiment. As described above, a thickness value is first estimated for a subset of vertices and the corresponding thickness signature is computed. The embedded watermark is then extracted using the secret key used at embedding and the appropriate decoding method, correlation-based for spread-spectrum embedding and quantization based for binning schemes.

Thus, in a first step 200, the thickness values associated to a subset of vertices of the watermarked mesh are computed. These thickness values are computing according to any of the previously disclosed variants e.g. skeleton-based, diameter-based, etc. The thickness signature is then computed as described in the previous sections. In a preferred embodiment, this signature is the normalize average of the thickness values inside the bins of a histogram.

Then, in a second step 201, the watermark payload is extracted using the secret key and the thickness signature computed in the previous step. In the variant where the thickness signature is composed of average thickness values (or the pseudo-random projection of several average thickness values) which have been modulated around 0.5, the decoder compares each element of the computed thickness signature to the threshold 0.5 and decides on the value of the bit based on the sign of the comparison. In the variant where the thickness signature is composed of area values of surface patches which have been quantized, the decoder computes the quantized value of each element of the computed thickness signature and decides on the value of the bit based on the parity of this quantized value.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a Blu-ray, a DVD often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one skilled in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for watermarking a three-dimensional object, wherein said three-dimensional object is represented by a mesh, said mesh comprising a plurality of vertices, said method comprising:

Computing, using processor circuitry, an original thickness signature for said mesh from a plurality of thickness values, wherein a thickness value is computed for a vertex of said mesh and wherein said thickness value for a vertex comprises a distance between said vertex and a cloud of half diameter points wherein a half diameter point is a point placed along an internal normal of a vertex of said mesh at half the diameter value associated to said vertex;

Determining, using the processor circuitry, a target thickness signature as function of a watermark payload and of said original thickness signature;

Modifying, using the processor circuitry, a position of at least one vertex of the mesh wherein a thickness signature computed for said modified mesh reaches said target thickness signature and wherein a distortion constraint between said mesh and said modified mesh is satisfied;

wherein the watermarking is pose-invariant and resistant to noise addition and desynchronization attack.

2. The method according to claim 1 wherein modifying a position of at least one vertex of the mesh comprises using a solver in order to obtain said target thickness signature while minimizing a distortion metric between said mesh and said modified mesh.

3. The method according to claim 2 wherein said distortion metric comprises a mean square error of positions of said plurality of vertices.

4. The method according to claim 1 wherein said thickness signature comprises an average thickness value in each bin of an histogram of said plurality of thickness values or an area corresponding to a surface patch associated to the vertices within a bin of said histogram.

5. A method for detecting a watermark in a three-dimensional object, wherein said three-dimensional object is represented by a mesh comprising a plurality of vertices, said method comprising:
   Computing, using processor circuitry, a thickness signature for said mesh from a plurality of thickness values, wherein a thickness value is computed for a vertex of said mesh and wherein said thickness value for a vertex comprises a distance between said vertex and a cloud of half diameter points wherein a half diameter point is a point placed along an internal normal of a vertex of said mesh at half the diameter value associated to said vertex;
   Determining, using the processor circuitry, a watermark payload from said thickness signature,
      wherein the watermark is pose-invariant and resistant to noise addition and desynchronization attack.

6. A method for creating a three-dimensional object, wherein said three-dimensional object is represented by a mesh, said mesh comprising a plurality of vertices, said three-dimensional object comprising:
   a thickness signature computed, using processor circuitry, for said mesh from a plurality of thickness values is close to a target thickness signature, wherein a thickness value is computed for a vertex of said mesh and wherein said thickness value for a vertex comprises a distance between said vertex and a cloud of half diameter points wherein a half diameter point is a point placed along an internal normal of a vertex of said mesh at half the diameter value associated to said vertex;
   said target thickness signature being a function of a watermark payload and an original thickness signature corresponding to an original three-dimensional object wherein the watermark payload is pose-invariant and resistant to noise addition and desynchronization attack.

7. A device for watermarking a three-dimensional object wherein said three-dimensional object is represented by a mesh, said mesh comprising a plurality of vertices, the device comprising at least one processor configured to:
   Compute, using processor circuitry, an original thickness signature for said mesh from a plurality of thickness values, wherein a thickness value is computed for a vertex of said mesh, and wherein said thickness value for a vertex comprises a distance between said vertex and a cloud of half diameter points wherein a half diameter point is a point placed along an internal normal of a vertex of said mesh at half the diameter value associated to said vertex;
   Determine, using the processor circuitry, a target thickness signature as function of a watermark payload and of said original thickness signature;
   Modify, using the processor circuitry, a position of at least one vertex of the mesh wherein a thickness signature computed for said modified mesh reaches said target thickness signature and wherein a distortion constraint between said mesh and said modified mesh is satisfied;
      wherein the watermarking is pose-invariant and resistant to noise addition and desynchronization attack.

8. The device according to claim 7 wherein to modify a position of at least one vertex of the mesh, said device further comprises a solver in order to obtain said target thickness signature while minimizing a distortion metric between said mesh and said modified mesh.

9. The device according to claim 8 wherein said distortion metric comprises a mean square error of positions of said plurality of vertices.

10. A device for detecting a watermark in a three-dimensional object wherein said three-dimensional object is represented by a mesh comprising a plurality of vertices, said device comprising at least one processor configured to:
    Compute, using processor circuitry, a thickness signature for said mesh from a plurality of thickness values, wherein a thickness value is computed for a vertex of said mesh and wherein said thickness value for a vertex comprises a distance between said vertex and a cloud of half diameter points wherein a half diameter point is a point placed along an internal normal of a vertex of said mesh at half the diameter value associated to said vertex;
    Determine, using the processor circuitry, a watermark payload from said thickness signature;
       wherein the watermark is pose-invariant and resistant to noise addition and desynchronization attack.

11. A non-transitory program storage device, readable by a computer, tangibly embodying a program of instructions executable by the computer to perform a method for watermarking a three-dimensional object represented by a mesh, said mesh comprising a plurality of vertices, said method comprising:
    Computing, using processor circuitry, an original thickness signature for said mesh from a plurality of thickness values, wherein a thickness value is computed for a vertex of said mesh and wherein said thickness value for a vertex comprises a distance between said vertex and a cloud of half diameter points wherein a half diameter point is a point placed along an internal normal of a vertex of said mesh at half the diameter value associated to said vertex;
    Determining, using the processor circuitry, a target thickness signature as function of a watermark payload and of said original thickness signature;
    Modifying, using the processor circuitry, a position of at least one vertex of the mesh wherein a thickness signature computed for said modified mesh reaches said target thickness signature and wherein a distortion constraint between said mesh and said modified mesh is satisfied;
       wherein the watermarking is pose-invariant and resistant to noise addition and desynchronization attack.

* * * * *